United States Patent
Lana et al.

(10) Patent No.: US 10,174,691 B2
(45) Date of Patent: *Jan. 8, 2019

(54) SYSTEMS AND METHODS FOR CONTROLLING EGR FLOW DURING TRANSIENT CONDITIONS

(71) Applicant: Cummins Inc., Columbus, IN (US)

(72) Inventors: Carlos Alcides Lana, Columbus, IN (US); David J. Stroh, Columbus, IN (US); Samuel C. Geckler, Columbus, IN (US); Marten H. Dane, Columbus, IN (US); Anthony K. Perfetto, Columbus, IN (US); Karthik Kappaganthu, Bloomington, IN (US); Govindarajan Kothandaraman, Columbus, IN (US)

(73) Assignee: Cummins Inc., Columbus, IN (US)

( * ) Notice: Subject to any disclaimer, the term of this patent is extended or adjusted under 35 U.S.C. 154(b) by 154 days.

This patent is subject to a terminal disclaimer.

(21) Appl. No.: 15/138,892

(22) Filed: Apr. 26, 2016

(65) Prior Publication Data

US 2016/0237928 A1    Aug. 18, 2016

Related U.S. Application Data

(63) Continuation of application No. PCT/US2014/063802, filed on Nov. 4, 2014.
(Continued)

(51) Int. Cl.
*F02B 33/44* (2006.01)
*F02M 25/07* (2006.01)
(Continued)

(52) U.S. Cl.
CPC .......... *F02D 41/0077* (2013.01); *F02B 37/18* (2013.01); *F02B 37/24* (2013.01);
(Continued)

(58) Field of Classification Search
CPC ............. F02D 41/0077; F02D 41/0007; F02D 41/0072; F02D 41/008; F02D 2021/083;
(Continued)

(56) References Cited

U.S. PATENT DOCUMENTS 4,308,831 A * 1/1982 Sugasawa .............. F02M 26/43
                                                    123/198 F
6,141,959 A * 11/2000 Digeser .................. F02M 26/43
                                                    60/274
(Continued)

FOREIGN PATENT DOCUMENTS

CN    1906391        1/2007
CN    101970845      2/2011
(Continued)

OTHER PUBLICATIONS

International Search Report and Written Opinion, PCT/US2014/063802, dated Feb. 13, 2015, Cummins Inc.
(Continued)

*Primary Examiner* — Thai Ba Trieu
(74) *Attorney, Agent, or Firm* — Taft Stettinius & Hollister LLP

(57) ABSTRACT

Systems, apparatus, and methods are disclosed that include a divided exhaust engine with at least one primary EGR cylinder and a plurality of non-primary EGR cylinders. The systems, apparatus and methods control the amount of recirculated exhaust gas in a charge flow in response to EGR fraction deviation conditions.

39 Claims, 10 Drawing Sheets

Related U.S. Application Data

(60) Provisional application No. 61/899,558, filed on Nov. 4, 2013.

(51) Int. Cl.

| | | |
|---|---|---|
| *F02D 41/00* | (2006.01) | |
| *F02B 37/18* | (2006.01) | |
| *F02B 37/24* | (2006.01) | |
| *F02D 13/02* | (2006.01) | |
| *F02P 5/15* | (2006.01) | |
| *F02M 26/43* | (2016.01) | |
| *F02M 26/13* | (2016.01) | |
| *F02M 26/37* | (2016.01) | |
| *F02M 26/05* | (2016.01) | |
| *F02M 26/06* | (2016.01) | |
| *F02D 21/08* | (2006.01) | |

(52) U.S. Cl.
CPC ......... *F02D 13/02* (2013.01); *F02D 13/0261* (2013.01); *F02D 41/0007* (2013.01); *F02D 41/008* (2013.01); *F02D 41/0072* (2013.01); *F02M 26/05* (2016.02); *F02M 26/06* (2016.02); *F02M 26/13* (2016.02); *F02M 26/37* (2016.02); *F02M 26/43* (2016.02); *F02P 5/1512* (2013.01); *F02P 5/1516* (2013.01); *F02D 2021/083* (2013.01); *F02D 2041/001* (2013.01); *Y02T 10/144* (2013.01); *Y02T 10/18* (2013.01); *Y02T 10/46* (2013.01); *Y02T 10/47* (2013.01)

(58) Field of Classification Search
CPC .. F02D 2041/001; F02M 26/05; F02M 26/06; F02M 26/13; F02M 26/37; F02M 26/43; F02B 37/18; F02B 37/183; F02B 37/186; F02B 37/24; F02P 5/1512; F02P 5/1516; Y02T 10/144; Y02T 10/18; Y02T 10/46
USPC ........ 60/605.2; 701/108; 123/568.11–568.12
See application file for complete search history.

(56) References Cited

U.S. PATENT DOCUMENTS

| | | | |
|---|---|---|---|
| 8,146,572 | B2 | 4/2012 | Macfarlane |
| 9,518,519 | B2* | 12/2016 | Dane ..................... F02M 26/43 |
| 2006/0021346 | A1 | 2/2006 | Whelan et al. |
| 2009/0308070 | A1 | 12/2009 | Alger et al. |
| 2012/0000448 | A1 | 1/2012 | Freund et al. |
| 2012/0023937 | A1 | 2/2012 | Styles et al. |
| 2012/0048244 | A1 | 3/2012 | Hayman et al. |
| 2012/0060497 | A1 | 3/2012 | Roth |
| 2012/0078492 | A1* | 3/2012 | Freund ..................... F02M 26/43 701/108 |
| 2012/0204844 | A1 | 8/2012 | Gingrich et al. |
| 2012/0297767 | A1 | 11/2012 | Hofbauer |
| 2012/0323465 | A1* | 12/2012 | Peters ..................... F02M 26/43 701/108 |
| 2012/0323470 | A1* | 12/2012 | Klingbeil ................ F02M 26/43 701/108 |
| 2013/0030672 | A1 | 1/2013 | Klingbeil et al. |
| 2013/0247883 | A1 | 9/2013 | Onishi et al. |
| 2014/0020382 | A1* | 1/2014 | Subramanian ......... F02M 26/05 60/605.2 |
| 2014/0041384 | A1* | 2/2014 | Mischler ................ F02M 26/43 60/605.2 |
| 2014/0202433 | A1* | 7/2014 | Dane ...................... F02M 26/43 123/568.11 |
| 2014/0305416 | A1* | 10/2014 | Gukelberger .......... F02M 26/43 123/568.21 |
| 2014/0366532 | A1* | 12/2014 | Talwar ................... F02M 26/43 60/605.2 |
| 2014/0373528 | A1* | 12/2014 | Gerty ..................... F02M 26/05 60/605.2 |
| 2015/0114341 | A1* | 4/2015 | Geckler ................. F02M 26/43 123/568.11 |
| 2015/0176513 | A1* | 6/2015 | Lana ...................... F02M 26/43 123/406.48 |
| 2015/0292445 | A1* | 10/2015 | Subramanian ......... F02M 26/05 60/605.2 |
| 2016/0053729 | A1* | 2/2016 | Geckler ................. F02M 26/43 123/445 |
| 2016/0169186 | A1* | 6/2016 | Stroh ..................... F02P 5/1516 123/406.48 |
| 2016/0252054 | A1* | 9/2016 | Dane ...................... F02M 26/43 60/602 |
| 2017/0002772 | A1* | 1/2017 | Perfetto ................. F02M 26/43 |

FOREIGN PATENT DOCUMENTS

| | | |
|---|---|---|
| CN | 102037234 | 4/2011 |
| CN | 102959224 | 3/2013 |
| JP | 2013119838 | 6/2013 |
| WO | 9835153 | 8/1998 |
| WO | 2009100451 | 8/2009 |
| WO | 2011025586 | 3/2011 |
| WO | 2012039732 | 3/2012 |

OTHER PUBLICATIONS

The State Intellectual Property Office of the People's Republic of China, First Office Action and Search Report for corresponding Chinese patent application No. 201480080423.0 dated Sep. 9, 2018, 12 pgs.

* cited by examiner

SYSTEMS AND METHODS FOR CONTROLLING EGR FLOW DURING TRANSIENT CONDITIONS

CROSS-REFERENCE TO RELATED APPLICATION

The present application is a continuation of International Application No. PCT/US2014/063802 filed on Nov. 4, 2014, which claims the benefit of the filing date of U.S. Provisional Application Ser. No. 61/899,558 filed on Nov. 4, 2013, each of which is incorporated herein by reference in its entirety.

BACKGROUND

Engines operating with one or more cylinders as dedicated exhaust gas recirculation (EGR) cylinders enjoy greatly simplified controls and pressure management, fewer hardware devices, and other benefits. However, these simplifications come at the cost of a loss of control over the system, including a loss of control of the EGR fraction during low load and transient conditions. When nominal cylinders are dedicated to providing EGR, and standard fueling and controls are applied, the EGR fraction provided by the cylinders is limited to the simple ratio of the number of EGR cylinders to the total number of cylinders. For example, an engine with one cylinder dedicated to EGR and four cylinders total will operate at a 25% EGR fraction if all of the cylinders are operated in the same manner.

However, during transient conditions the EGR fraction due to volume filling dynamics in the dedicated EGR flow path can vary significantly from the EGR fraction. In addition, in certain steady state conditions, the volumetric efficiency change with load can cause deviations of the EGR fraction from its expected value. When the EGR fraction decreases from its expected value, knock conditions can be developed. When the EGR fraction increases from its expected value, cylinder misfire and combustion instability can result. Therefore, further technological developments are desirable in this area.

SUMMARY

One embodiment is a unique system, method and apparatus that includes a divided exhaust engine and control an EGR fraction in a charge flow to a plurality of cylinders of the engine in response to an EGR fraction deviation condition. Other embodiments include unique methods, systems, and apparatus to control EGR flow from one or more primary EGR cylinders of a divided exhaust engine, to mitigate EGR fraction deviations from an expected EGR fraction, and/or to manage an EGR fraction during transient conditions.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
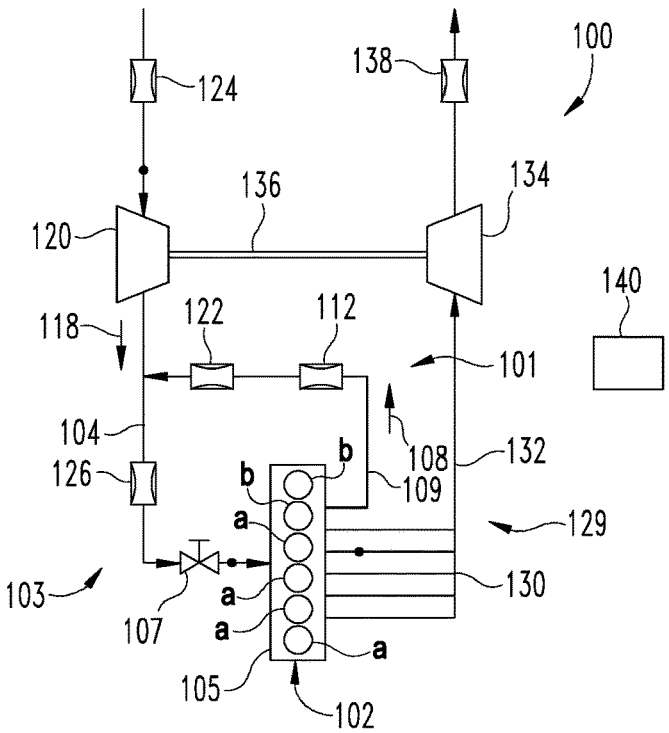
FIG. 1 is a schematic depiction of a system having an engine with primary EGR cylinders and additional non-primary or secondary cylinders that do not contribute to EGR flow.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 is depicted having an engine 102. The engine 102 is an internal combustion engine of any type, and can include a stoichiometric engine, a gasoline engine, and/or a natural gas engine. In certain embodiments, the engine 102 includes a lean combustion engine such as a lean burn gasoline engine or a diesel cycle engine. In certain embodiments, the engine 102 may be any engine type producing emissions that may include an exhaust gas recirculation (EGR) system, for example to reduce $NO_x$ emissions from the engine 102. The engine 102 includes a plurality of cylinders a, b. The number of cylinders a, b may be any number suitable for an engine, and the arrangement of cylinders may be in-line, V, or any suitable arrangement. The system 100 includes an inline 6 cylinder arrangement for illustration purposes only and is not limited to such.

The engine 102 includes primary EGR cylinders b, and other or remaining non-primary EGR cylinders a, that are not primary EGR cylinders b. Non-primary EGR cylinders a can be completely flow isolated from the EGR system 101 in some embodiments, as discussed further below. In other embodiments, non-primary EGR cylinders a are connected to provide at least some exhaust flow to the EGR system 101, as discussed further below. In other embodiments, the exhaust system 129 connected to non-primary EGR cylinders a may receive exhaust flow from primary EGR cylinders b under certain operating conditions, as discussed further below. The term primary EGR, as utilized herein, should be read broadly. Any EGR arrangement wherein, during at least certain operating conditions, the entire exhaust output of certain cylinders is recirculated to the engine intake system 103 is a primary EGR cylinder. A primary EGR cylinder typically, at least during primary EGR operation, includes exhaust divided from one or more of the remaining cylinders that are not primary EGR cylinders.

In the system 100, the EGR flow 108 recirculates in an EGR passage 109 and combines with intake flow 118 at a position upstream of an intake manifold 105 of intake system 103. Intake manifold 105 provides a charge flow including the intake flow 118 combined with EGR flow 108. Intake manifold 105 is connected to an intake passage 104 that includes an intake throttle 107 to regulate the charge flow to cylinders a, b. Intake passage 104 may also include a charge air cooler 126 to cool the charge flow provided to intake manifold 105. Intake passage 104 also includes a compressor 120 to compress the intake air flow 118 received from an intake air cleaner 124.

The EGR flow 108 may combine with the intake flow 118 at an outlet of a restriction 122 in EGR passage 109 through, for example, a restriction 122 that is, for example, a mixer or any other suitable arrangement. In certain embodiments, the EGR flow 108 returns to the intake manifold 105 directly. The EGR system 101 may be a low-pressure loop, for example returning to the intake at a position upstream of a compressor 120, or a high-pressure loop, for example returning to the intake at a position downstream of compressor 120 and/or at the intake manifold 105. In certain embodiments, the system 100 does not include a compressor or any other type of boost pressure generating device. The example system 100 includes an EGR cooler 112 in the EGR passage 109. In other embodiments, EGR passage 109 can include a bypass with a valve that selectively allows EGR flow to bypass the EGR cooler 112. The presence of an EGR cooler 112 and/or an EGR cooler bypass is optional and non-limiting.

Non-primary EGR cylinders a are connected to an exhaust system 129 that includes an exhaust manifold 130 that receives exhaust gases from non-primary EGR cylinders a, an exhaust passage 132 that receives exhaust gas from exhaust manifold 130, a turbine 134 in exhaust passage 132 that is operable via the exhaust gases to drive compressor 120 via shaft 136, and an aftertreatment system 138 in exhaust passage 132 that is configured to treat emissions in the exhaust gas. Turbine 134 can be a variable geometry turbine with an adjustable inlet, or include a wastegate to bypass exhaust flow. Other embodiments contemplate an exhaust throttle (not shown) in the exhaust system 129.

In certain embodiments, the system 100 includes a controller 140 structured to perform certain operations to control a divided exhaust gas engine such as engine 102. In certain embodiments, the controller 140 forms a portion of a processing subsystem including one or more computing devices having memory, processing, and communication hardware. The controller 140 may be a single device or a distributed device, and the functions of the controller 140 may be performed by hardware or by instructions encoded on computer readable medium. The controller 140 may be included within, partially included within, or completely separated from an engine controller (not shown). The controller 140 is in communication with any sensor or actuator throughout the system 100, including through direct communication, communication over a datalink, and/or through communication with other controllers or portions of the processing subsystem that provide sensor and/or actuator information to the controller 140.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in combustion performance of internal combustion engines, improvements in emissions performance, aftertreatment system performance, engine torque generation and torque control, engine fuel economy performance, improved durability of exhaust system components for internal combustion engines, and engine noise and vibration control. Without limitation, example and non-limiting technological fields that are improved include the technological fields of internal combustion engines and related apparatuses and systems as well as vehicles including the same.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 2:
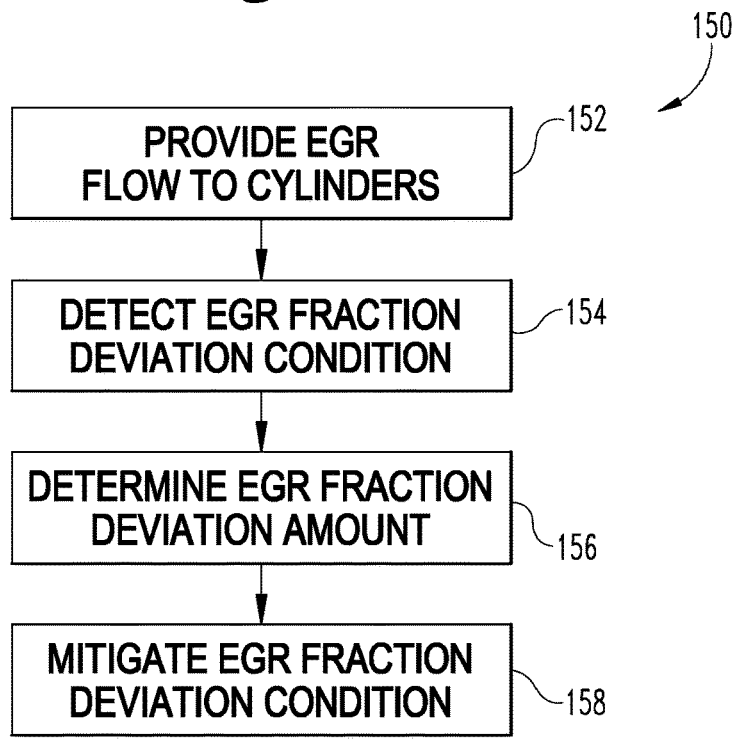
FIG. 2 is a flow diagram of one embodiment of a procedure to mitigate an EGR fraction deviation condition.

Certain systems are described following, and include examples of controller operations in various contexts of the present disclosure. In certain embodiments, such as procedure 150 shown in FIG. 2, an EGR flow 108 is provided to the intake system 103 to mix with the intake flow at an operation 152 that includes providing a charge flow to cylinders a, b that includes an amount of recirculated exhaust gas that include all or a portion of the EGR flow 108. The controller 140 is operable to interpret an EGR fraction deviation condition from a deviation between the actual EGR fraction provided by the amount of recirculated exhaust gas an expected EGR fraction, such as at operation 154. Controller 140 is further operable to determine an EGR fraction deviation amount from the expected EGR fraction, such as at operation 156. In response to the EGR fraction deviation condition and/or the EGR fraction deviation amount, the controller 140 is operable to provide an EGR fraction compensation command such as at operation 158 that mitigates the EGR fraction deviation condition by adjusting the amount of recirculated exhaust gas in the charge flow toward the expected EGR fraction.

The EGR fraction deviation condition includes any condition that may indicate that the amount of recirculated exhaust gas provided by the EGR flow deviates or is expected to deviate from the expected EGR fraction. In one embodiment, the expected EGR fraction indicates that portion of the total exhaust flow that is expected to be provided as recirculated exhaust gas in the charge flow by the primary EGR cylinders b under steady state conditions with all cylinders a, b operating in the same manner and without recirculated exhaust gas flow contribution from non-primary EGR cylinders a. In another embodiment, the expected EGR fraction is provided in a first part by one or more primary EGR cylinder(s) b and in a second part by recirculation of a portion of the exhaust flow from non-primary EGR cylinders a to supplement the EGR flow from primary EGR cylinders b in an amount that satisfies the expected EGR fraction.

Non-limiting examples of events resulting in EGR fraction deviation conditions include an accelerator tip-in condition, an accelerator tip-out condition, transient operating conditions of engine 102, and a steady state low load condition. An accelerator tip-in condition can result in a reduction of the amount of recirculated exhaust gas due to a temporary starving condition created by the lack of accumulated EGR flow 108 in the EGR system 101. An accelerator tip-out condition can result in an excess amount of recirculated exhaust gas due to excess EGR flow 108 accumulated in the EGR system 101. A steady state condition low load condition can result in an excess amount of recirculated exhaust gas due to internal residues in the EGR system 101 that occur due to volumetric efficiency changes. Controller 140 is operable to interpret an EGR fraction deviation condition in response to determining a deviation of the amount of recirculated exhaust gas from the expected EGR fraction, detection of an accelerator tip-in condition, detection of an accelerator tip-out condition, determining a transient operating condition for engine 102, determining a steady state low load condition, and combinations of these and/or other transient condition indications.

Figure 3:
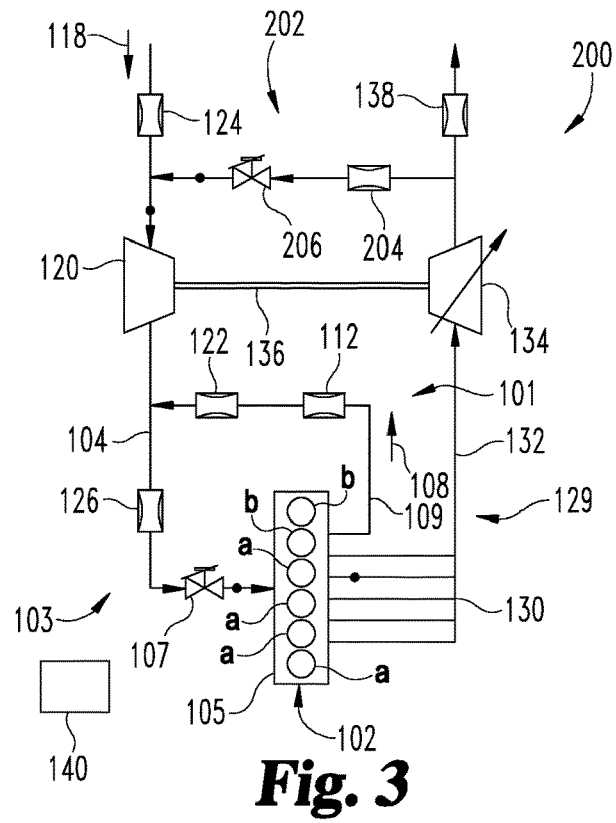
FIG. 3 is a schematic depiction of a system having primary EGR cylinders connected to the intake passage with an EGR passage and a low pressure exhaust gas recirculation loop.

The system 200 in FIG. 3 is a modification of system 100 in FIG. 1 and like components are assigned common reference numerals. Engine 102 in system 200 includes a single primary EGR cylinder b that is dedicated to providing a portion of the amount of recirculated exhaust gas for the EGR fraction. System 200 also includes a low pressure EGR system 202 with a low pressure EGR passage 208 that connects exhaust passage 132 downstream of turbine 134 to intake passage 104 upstream of compressor 120 to provide a supplemental recirculated exhaust gas flow from a portion of the exhaust flow that corresponds to the remaining part of the expected EGR fraction. Low pressure EGR system 200 includes an EGR cooler 204 and an EGR control valve 206 downstream of EGR cooler 204. EGR control valve 206 can include, for example, an actuator (not shown) that is operable by controller 140 to open and close EGR control valve 206 to provide the exhaust flow to supplement the base portion of EGR fraction supplied by primary EGR cylinder b in an amount that supplies an amount of recirculated exhaust gas in the charge flow that satisfies the expected EGR fraction and/or mitigates any EGR fraction deviation condition.

Controller 140 is operable to interpret EGR fraction deviation conditions and actuate EGR control valve 206 to a position that increases or decreases the amount of recirculated exhaust gas flow from the other or remaining non-primary EGR cylinders a from exhaust passage 132 so that, when combined with the EGR flow 108 from primary EGR cylinder b, the expected EGR fraction is provided in the charge flow.

In this or any embodiment described herein, the actual EGR fraction or EGR flow can be determined, for example, by determining the difference between the charge flow at intake manifold 105 and the fresh air intake flow upstream of low pressure EGR system 200; a direct measurement or calculation of EGR flow; a direct measurement or calculation of intake flow upstream of the mixing location of EGR flow 108 and intake flow 118 and the combined charge flow downstream of the mixing location; a measurement of $O_2$ levels in the EGR passage 109 and exhaust manifold 130; a measurement of engine operating conditions indicating the occurrence of likely occurrence of a transient event creating an EGR fraction deviation condition, or any suitable EGR flow or EGR fraction determination technique. The charge, intake, and/or EGR flow can be determined by a mass air flow sensor, by calculation using a speed-density approach (charge flow), or any other flow determination technique or device.

Controller 140 is responsive to deviations in the actual EGR fraction of the charge flow from the expected EGR fraction to output an EGR fraction deviation mitigation command to control the exhaust gas flow through low pressure EGR system 200, and in some circumstance prevent flow through low pressure EGR system 200, to provide an amount of recirculated exhaust gas from exhaust system 129 with the EGR flow 108 from primary EGR cylinder b that maintains or is driven toward the expected EGR fraction.

Figure 4:
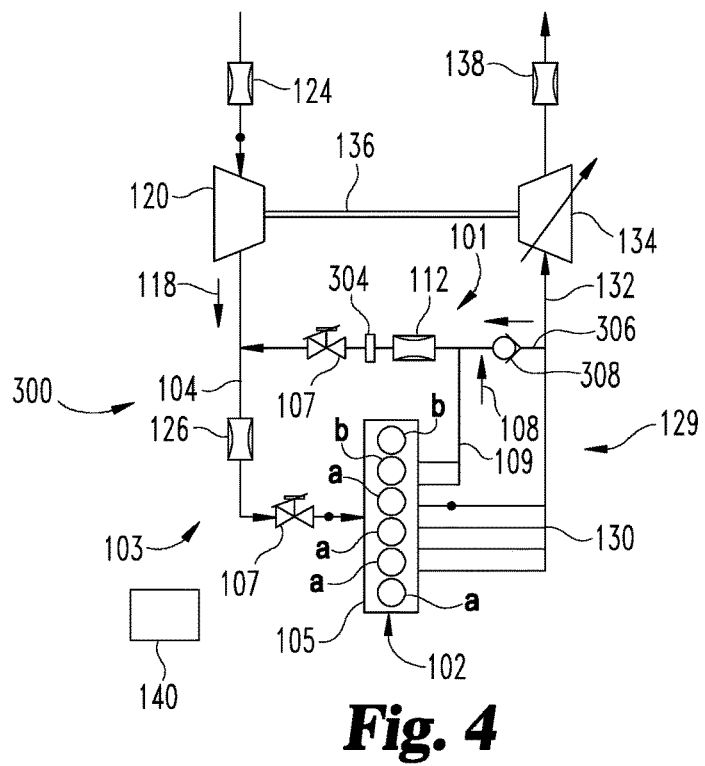
FIG. 4 is a schematic depiction of a system having primary EGR cylinders with an EGR passage connected to receive exhaust flow from the exhaust passage of the secondary EGR cylinders that are not the primary EGR cylinders.

The system 300 in FIG. 4 is a modification of system 100 and like components are assigned common reference numerals. System 300 includes an EGR valve 302 in EGR passage 109 downstream of EGR cooler 112. System 300 may further include an accumulator 304 in EGR passage 109. In the illustrated embodiment, accumulator 304 is upstream of EGR valve 302 and EGR valve 302 is operable to control EGR flow from accumulator 304 into the intake flow 118. System 300 also includes high pressure EGR passage 306 that includes a one-way valve 308 connecting exhaust passage 132 to EGR passage 109.

EGR valve 302 and one-way valve 308 can be provided with actuators (not shown) that are connected to and operable by controller 140. Controller 140 is operable to interpret EGR fraction deviation conditions and output an EGR fraction deviation mitigation command to actuate EGR valve 302 and/or one-way valve 308 in response to the EGR fraction deviation conditions to adjust amount of recirculated exhaust gas to intake passage 104, such as during transient conditions. For example, during accelerator tip-in conditions, one-way valve 308 is opened to admit a portion of the exhaust gas flow from exhaust passage 132 to EGR passage 109 and prevent or mitigate starving of the amount of recirculated exhaust gas in intake passage 104 required for the expected EGR fraction. EGR valve 302 can also be opened if closed under such conditions to increase or maximize EGR flow 108 to intake passage 104 to compensate for a lower than expected EGR fraction.

During accelerator tip-out conditions, EGR valve 302 is closed to reduce EGR flow 108 to intake passage 104 and excess EGR flow is stored in accumulator 304 to prevent EGR flow into intake system 103 that is in excess of the expected EGR fraction. During steady state conditions where the amount of recirculated exhaust gas is greater than the expected EGR fraction, EGR valve 302 can be closed to reduce EGR flow 108 by decreasing volumetric efficiency. When restricting flow with EGR valve 302, increased residuals can be mitigated by adjusting the overlap in variable valve timing and by spark retarding in the primary EGR cylinders b.

Figure 5:
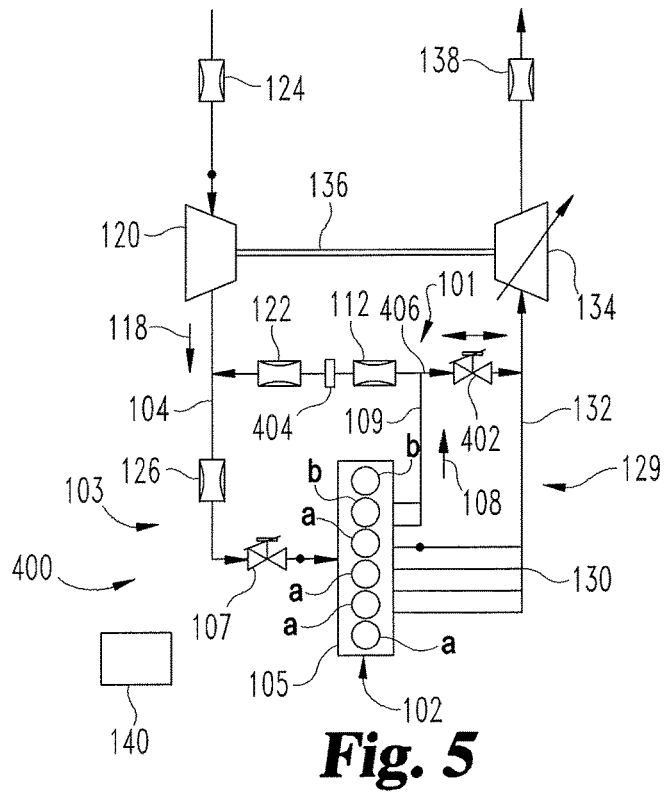
FIG. 5 is a schematic depiction of a system having primary EGR cylinders with an EGR passage connected to provide exhaust flows between the EGR passage and the exhaust passage of the other cylinders.

The system 400 in FIG. 5 is a modification of system 100 and like components are assigned common reference numerals. System 400 can include one primary EGR cylinder b, or multiple primary EGR cylinders b as shown. System 400 includes an EGR valve 402 in a high pressure EGR passage 406 and an accumulator 404 in EGR passage 109. High pressure EGR passage 406 connects EGR passage 109 to exhaust passage 132 upstream of turbine 134.

EGR valve 402 includes an actuator (not shown) that is connected to controller 140. Controller 140 is operable to interpret EGR fraction deviation conditions and output an EGR fraction deviation mitigation command to actuate EGR valve 402 to control the pressure in accumulator 404, which controls EGR flow 108 into the intake system 103. For example, during accelerator tip-in conditions, EGR flow 108 alone is not sufficient to supply the amount of recirculated exhaust gas for the expected EGR fraction, and EGR valve 402 controls the pressure in accumulator 404 to allow a portion of the exhaust gas flow from exhaust passage 132 into EGR passage 109 and prevent starving of recirculated exhaust gas to intake passage 104. During accelerator tip-out conditions, EGR valve 402 controls the pressure in accumulator 404 by admitting a portion of the EGR flow 108 from EGR passage 109 into exhaust passage 132, which is redirected to turbine 134 and reduces the pressure in accumulator 404 and the amount of recirculated exhaust gas that is provided by EGR flow 108 to intake passage 104.

The amount of EGR flow 108 from EGR passage 109 that is provided to exhaust system 129 can be limited in response to emissions requirements for aftertreatment device 138. In certain embodiments, the high pressure exhaust gas flow from exhaust passage 132 can be provided in variables amounts to EGR passage 108 that are determined to supplement a base EGR flow 108 from, for example, a single primary EGR cylinder b to provide a desired or expected EGR fraction for all operating conditions.

Figure 6:
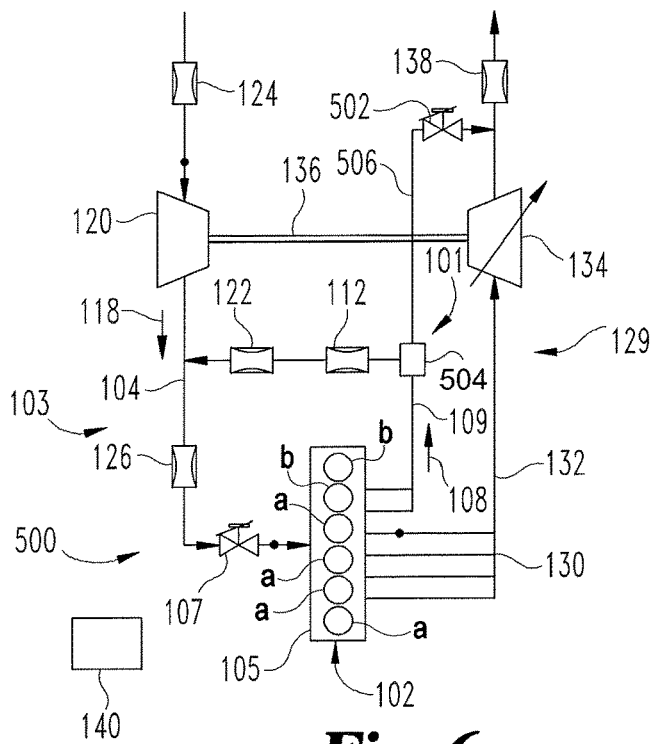
FIG. 6 is a schematic depiction of a system having primary EGR cylinders with an EGR passage connected to provide exhaust flows from the EGR passage to the exhaust passage of the other cylinders downstream of a turbine.

The system 500 in FIG. 6 is similar to system 400 and like components are assigned common reference numerals. System 500 includes an EGR valve 502 in a low pressure EGR passage 506 and an accumulator 504 in EGR passage 109. Low pressure EGR passage 506 connects EGR passage 109 to exhaust passage 132 downstream of turbine 134. Controller 140 is operable to interpret EGR fraction deviation conditions to output an EGR fraction deviation mitigation command and actuate EGR valve 502 to control the pressure in accumulator 504, which controls the recirculated exhaust amount provided by the EGR flow 108 that is received into intake passage 104 to satisfy the expected EGR fraction.

Figure 7:
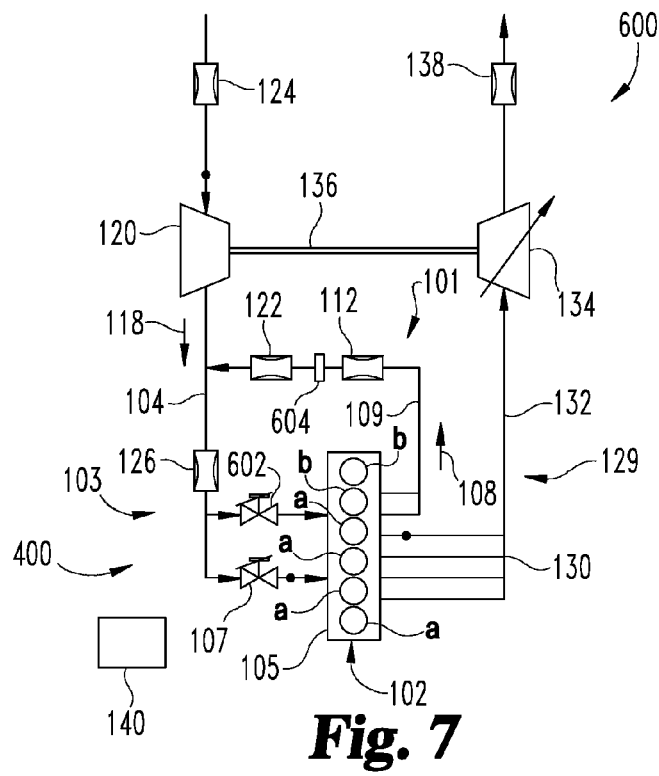
FIG. 7 is a schematic depiction of a system having primary EGR cylinders and an intake flow control arrangement to the primary EGR cylinders.

Referencing FIG. 7, a system 600 that is a modification of system 100 includes an intake throttle valve 602 fluidly coupled to one or more of the primary EGR cylinder(s) b and fluidly isolated from the non-primary EGR cylinders a. Fluidly isolated, as used herein, indicates that the non-primary EGR cylinders a are not downstream of the intake throttle valve 602, and the flow through the non-primary EGR cylinders a is not affected by the operations of the intake throttle valve 602 except indirectly through the reduction or increase in flow through the primary EGR cylinder(s) b. The intake throttle valve 602 may be a butterfly valve, gate valve, globe valve, or any other type of valve, and may include an orifice therethrough so that a minimum charge flow is provided to primary EGR cylinders b even if intake throttle valve 602 is closed. System 600 also includes an accumulator 604 in EGR passage 109 to store EGR flow 108 for recirculation and mixing with intake flow 118.

In certain embodiments, the controller 140 outputs an EGR fraction deviation mitigation command and modulates or actuates the intake throttle valve 602 in response to the EGR fraction deviation conditions to control the charge flow to primary EGR cylinders b to produce more or less EGR flow 108 for recirculation, based on whichever requirement is indicated by the EGR fraction deviation conditions. The pressure in accumulator 604 is changed by controlling the EGR intake throttle valve 602 to provide the desired increase or decrease in EGR flow 108 to the intake passage 104 depending on whether the amount of recirculated exhaust gas needs to increase or decrease to respond to the EGR fraction deviation condition.

Figure 8:
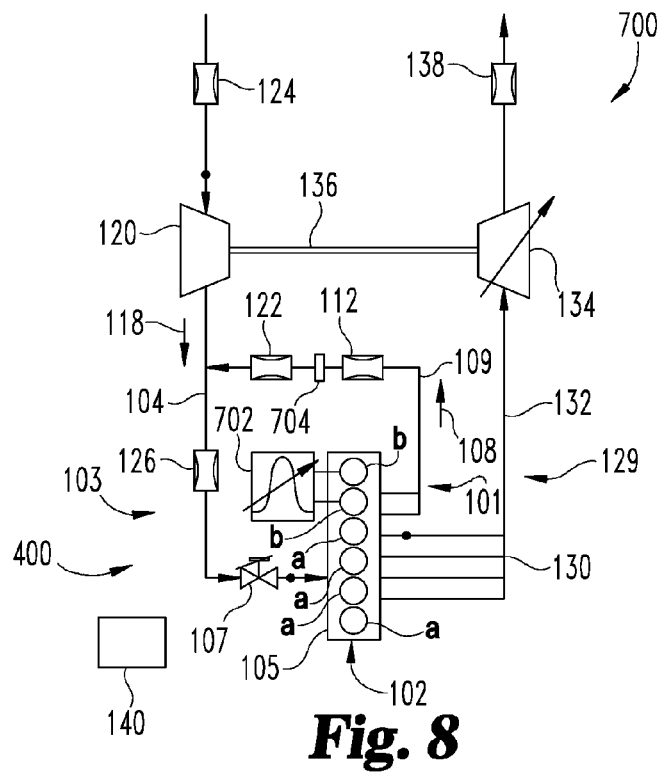
FIG. 8 is a schematic depiction of a system having primary EGR cylinders and a variable valve actuation control arrangement of the primary EGR cylinders.

Referencing FIG. 8, a system 700 that is a modification of system 100 includes a dedicated variable valve actuation mechanism 702 coupled to at least one of the intake valves and the exhaust valves of the primary EGR cylinder(s) b. The variable valve actuation mechanism 702 is mechanically isolated from the non-primary EGR cylinders a. Mechanically isolated, as used herein, indicates that the non-primary EGR cylinders a are not controlled by operations of the variable valve actuation mechanism 702, and the exhaust flow from the non-primary EGR cylinders a is not affected by the operations of the variable valve actuation mechanism 702 except indirectly through the reduction or increase in the charge flow and/or exhaust output through the primary EGR cylinder(s) b. System 700 also includes an accumulator 704 in EGR passage 109 to provide a store of EGR flow 108 for recirculation and mixing with the intake flow 118.

In certain embodiments, the controller 140 controls operation of the variable valve actuation mechanism 702 in response to the EGR fraction deviation conditions to output an EGR fraction deviation mitigation command and control the charge flow to and/or exhaust flow from primary EGR cylinders b to produce more or less EGR flow 108, whichever is indicated by the EGR fraction deviation conditions. The pressure in accumulator 704 is changed by controlling the variable valve actuation mechanism 702 to provide the desired increase or decrease in EGR flow 108 to intake passage 104 depending on whether an increase or decrease in an amount of the recirculated exhaust gas is required to respond to the EGR fraction deviation condition.

Figure 9:
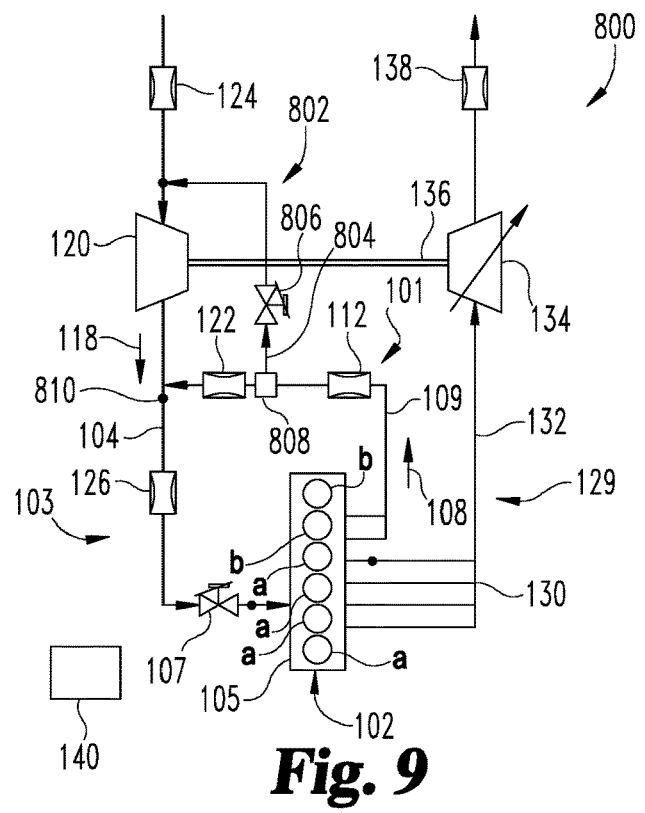
FIG. 9 is a schematic depiction of a system having primary EGR cylinders with an EGR passage connected upstream and downstream of a compressor in the intake system.

Referencing FIG. 9, a system 800 includes a compressor EGR loop 802 with a compressor EGR passage 804 and a control valve 806 in compressor EGR passage 804. Compressor EGR passage 804 connects to EGR passage 109 upstream of restriction 122 and to intake passage 104 upstream of an inlet to compressor 120. Control valve 806 is connected to controller 140 and is operable to control the EGR flow through compressor EGR passage 804 to direct at least a portion of EGR flow 108 to the inlet of compressor 120.

In certain embodiments, the controller 140 outputs an EGR fraction deviation mitigation command to an actuator (not shown) that controls operation of the control valve 806 in response to the EGR fraction deviation conditions control the amount of EGR flow 108 from EGR passage 109 that is provided to intake passage 104 through restriction 122 and compressor EGR passage 804 to increase or decrease an amount of the recirculated exhaust gas is required to respond to the EGR fraction deviation condition. For example, during accelerator tip-out conditions, control valve 806 can be opened to extend a length of the EGR flow path for the EGR flow 108, increasing the volume of the EGR flow path, and therefore reducing the peak EGR flow from accumulator 808 by distributing the EGR flow 108 over a longer flow path and increasing the time in which EGR flow 108 is provided to intake passage 104. In another example, during accelerator tip-in conditions, control valve 806 is closed to reduce the volume of the EGR flow path to intake passage 104, and therefore reducing the time to fill accumulator 808 to provide EGR flow 109 to intake passage 104. In a refinement of these examples, control valve 806 is normally closed and opened in response to an accelerator tip-out condition.

In still another embodiment, an EGR sensor 810 in intake passage 104 downstream of the mixing location of the EGR flow 108 and intake flow 118 can be used to determine the actual EGR fraction in the charge flow. EGR sensor 810 can be, for example, a sensor that detects $O_2$, $CO_2$, $H_2O$. The actual EGR fraction is compared to the expected EGR fraction to determine an EGR fraction deviation condition. Controller 140 interprets an EGR fraction deviation condition and/or EGR fraction deviation amount and opens or closes control valve 806 via a feedback control response to adjust the amount of recirculated exhaust gas in the charge flow and mitigate or reduce a deviation of the actual EGR fraction from the expected EGR fraction.

During steady state operating conditions for engine 102 with little or no transients, the position of control valve 806 does not impact the EGR fraction in the charge flow, and the actual EGR fraction deviates little from the expected EGR fraction. However, control valve 806 can be modulated under steady state operating conditions to respond to a surge in compressor 120 by increasing the load on turbine 134. For example, in response to a compressor surge or turbine speed overshoot condition under high loads, control valve 806 can be opened to provide EGR flow 108 to the inlet of compressor 120 through compressor EGR passage 804, which increases the load on compressor 120, which reduces the speed of turbine 134.

Figure 10:
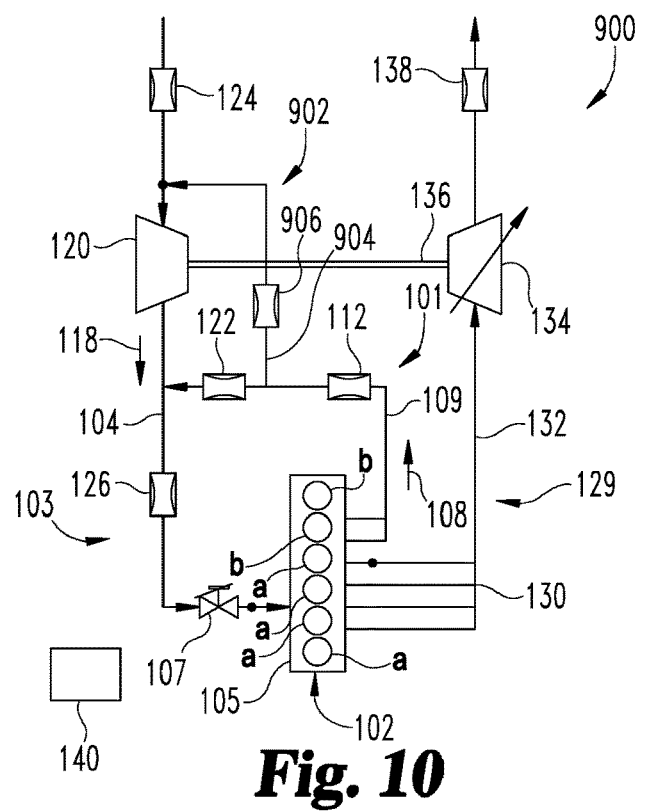
FIG. 10 is a schematic depiction of a system having primary EGR cylinders with an EGR passage connected upstream and downstream of a compressor in the intake system.

Referencing FIG. 10, a system 900 that is a modification of system 800 includes compressor EGR loop 902 with a compressor EGR passage 904 and a restriction 906 in compressor EGR passage 904. Restriction 906 in compressor EGR passage 904 allows an excess EGR flow that is produced by primary EGR cylinders b in response to, for example, and accelerator tip-in condition to be provided upstream of or at the inlet of compressor 120 to improve passive mixing of the EGR flow 108 with the intake air flow.

Figure 11:
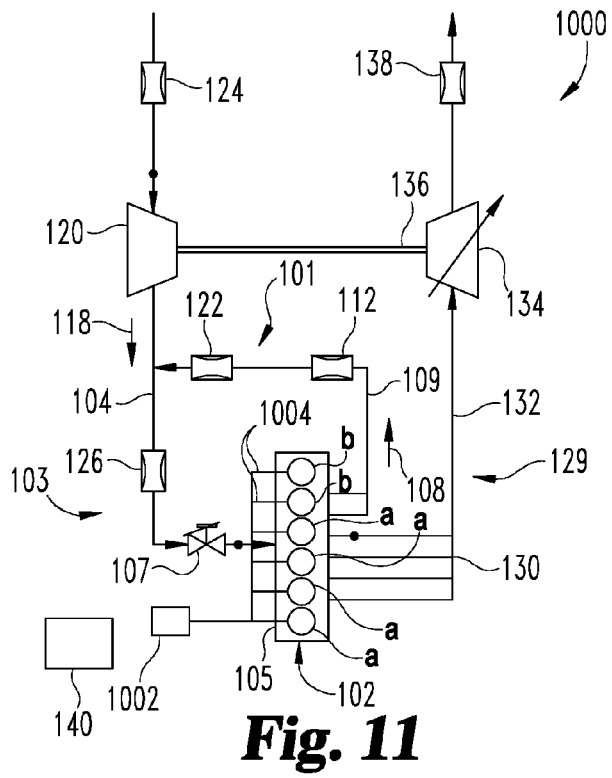
FIG. 11 is a schematic depiction of a system having an engine with primary EGR cylinders that are selectively de-fuelled.

Referencing FIG. 11, a system 1000 that is a modification of system 100 includes a fueling system 1002 connected to each of the cylinders a, b. In certain embodiments, each of the primary EGR cylinders b includes a direct injector 1004 for providing fueling from fueling system 1002. A direct injector, as utilized herein, includes any fuel injection device that injects fuel directly into the cylinder volume, and is capable of delivering fuel into the cylinder volume when the intake valve(s) and exhaust valve(s) are closed. The direct injector may be structured to inject fuel at the top of the cylinder or laterally. In certain embodiments, the direct injector 1004 may be structured to inject fuel into a combustion pre-chamber, although in certain embodiments the primary EGR cylinders b do not include a combustion pre-chamber. Each primary EGR cylinder b may include one or more direct injectors. The direct injectors may be the primary or the only fueling device for the primary EGR cylinders b, or alternatively the direct injectors may be an auxiliary or secondary fueling device for the primary EGR cylinders b. In certain embodiments, the direct injectors are capable of providing all of the designed fueling amount for the primary EGR cylinders b at any operating condition. Alternatively, the direct injectors may be only partially capable of providing the designed fueling amount, for example the direct injectors may be capable of providing a designated amount of fuel for a specific purpose, including any purpose described anywhere throughout the present disclosure.

In still other embodiments, primary EGR cylinders b include a port injector (not shown) in addition to or alternatively to direct injectors 1004. In these embodiments, the intake manifold 105 may be divided (not shown) to separate the charge flows to the respective cylinder groups a and b, or the port fuel injectors may be positioned such that no other cylinder in the system 1000 is downstream of the port fuel injector, i.e. only the target cylinder is downstream of the port fuel injector.

In certain embodiments, the controller 140 controls operation of the direct injectors 1004 (or port injectors) of primary EGR cylinders b in response to the EGR fraction deviation conditions to output an EGR fraction deviation mitigation command that de-fuels primary EGR cylinders b. De-fuelling the primary EGR cylinder(s) b reduces the exhaust output by primary EGR cylinders b contributing to the EGR flow 108, thus reducing the amount of recirculated exhaust gas and the actual EGR fraction in response to, for example, an accelerator tip-out condition, or a steady state condition at certain operating conditions such as at a low operating loads.

Figure 12:
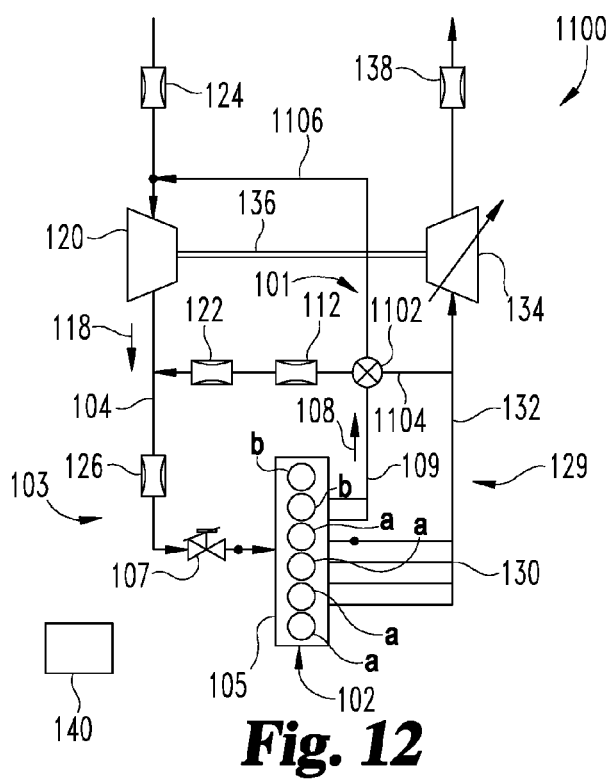
FIG. 12 is a schematic depiction of a system having primary EGR cylinders with an EGR passage connected to provide exhaust flows between the EGR passage and the exhaust passage of the other cylinders and from the EGR passage to the intake passage upstream of a compressor of the intake system.

Referencing FIG. 12, a system 1100 that is a modification of system 100 is illustrated that includes EGR passage 109 connected to exhaust passage 132 upstream of turbine 134 with a high pressure EGR passage 1104, and to an inlet of compressor 120 with a compressor EGR passage 1106, with a three-way valve 1102. Three-way valve 1102 is operable to selectively connect EGR passage 109 with exhaust passage 132 and provide a portion of EGR flow 108 to exhaust passage 132 through high pressure EGR passage 1104. Three-way valve 1102 is further operable to selectively connect EGR passage 109 with an inlet of or upstream of compressor 120 to provide a portion of EGR flow 108 through compressor EGR passage 1106.

In certain embodiments, the controller 140 controls operation of the three-way valve 1102 in response to the EGR fraction deviation conditions to adjust the amount of recirculated exhaust gas to reduce or mitigate the EGR fraction deviation condition in the charge flow. For example, in response to an accelerator tip-out condition, three-way valve 1102 can re-direct all or a portion of EGR flow 108 to the inlet of compressor 120 and/or to the inlet of turbine 134 to reduce the amount of EGR flow 108 to intake passage 104, reducing the amount of recirculated exhaust gas. In response to an accelerator tip-in condition, three-way valve 1102 can be positioned to prevent EGR flow 108 from being provided to the compressor inlet, and supplements EGR flow 108 from the primary EGR cylinders b with a portion of the exhaust flow from non-primary EGR cylinders a, which is then provided to intake passage 104 through restriction 122 to increase the amount of recirculated exhaust gas. Three-way valve 1102 allows the EGR flow 108 from primary EGR cylinders b to be selectively provided to high pressure EGR passage 1104 or to compressor EGR passage 1106, and/or in a selected ratio to one or both passages 1104, 1106 so that a deviation of the EGR fraction in the charge flow is reduced or mitigated.

Figure 13:
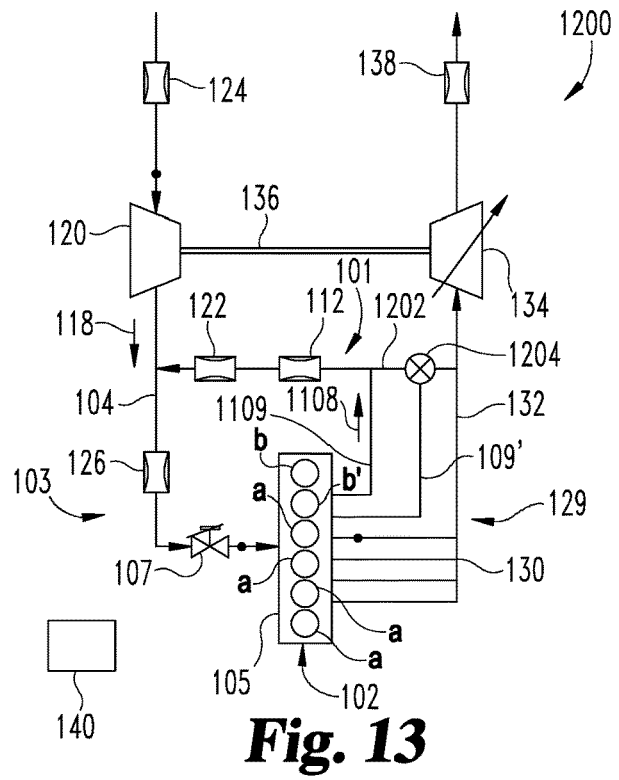
FIG. 13 is a schematic depiction of a system having primary EGR cylinders with an EGR passage of a portion of the primary EGR cylinders also connected to provide exhaust flows between the EGR passage and the exhaust passage of the other cylinders.

Referencing FIG. 13, a system 1200 that is a modification of system 100 is illustrated that includes EGR passage 109 connected to exhaust passage 132 with a high pressure EGR passage 1202. High pressure EGR passage 1202 includes a three-way valve 1204 that connects at least one of a flexible primary EGR cylinder b' to high pressure EGR passage 1202 through flexible EGR passage 109'. Cylinder b' is a flexible primary EGR cylinder since three-way valve 1204 is controllable by controller 140 to selectively provide EGR flow from flexible primary EGR cylinder b' to EGR passage 109, to exhaust passage 132, or to a combination of these through flexible EGR passage 109'. The remaining primary EGR cylinder(s) b are connected to EGR passage 109 and dedicated to providing a base amount of EGR flow 108.

In certain embodiments, the controller 140 controls operation of the three-way valve 1204 in response to the EGR fraction deviation conditions to provide the desired amount of recirculated exhaust gas to supplement the EGR flow 108 from primary EGR cylinder b to satisfy the expected EGR fraction in the charge flow. For example, in response to an accelerator tip-out condition, three-way valve 1204 can direct some or all of the exhaust flow from flexible primary EGR cylinder b' to exhaust passage 132 and the turbine inlet, reducing the amount of recirculated exhaust gas to the intake system 104. In response to an accelerator tip-in condition, three-way valve 1204 can be positioned to direct all of the exhaust flow from flexible primary EGR cylinder b', and possibly exhaust flow from exhaust passage 132 depending on the amount of recirculated exhaust flow required to satisfy the expected EGR fraction, to EGR passage 109 for mixing with intake flow 118 in intake system 104. Three-way valve 1204 can also be controlled to provide stoichiometric exhaust conditions to catalyst 138.

Figure 14A:
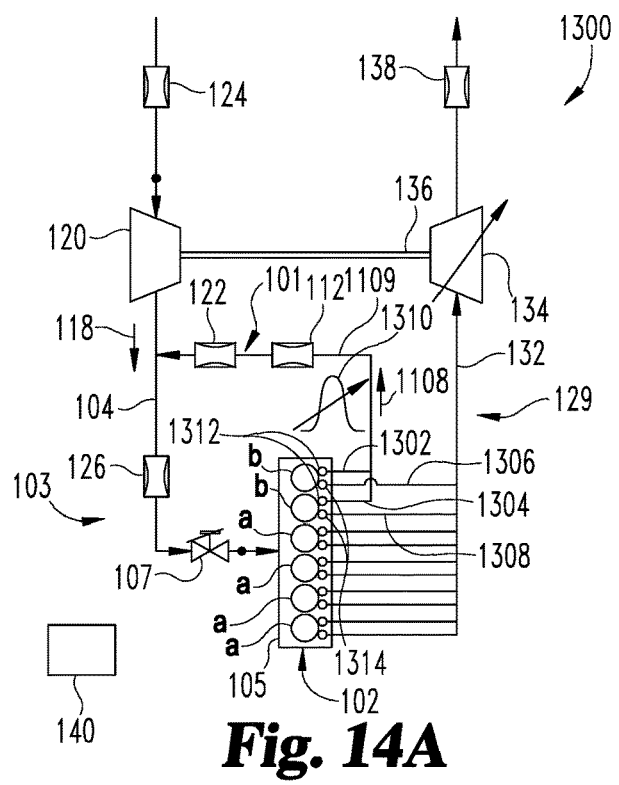
FIGS. 14A and 14B are schematic depictions of a system having primary EGR cylinders that are each connected to an EGR passage through a first exhaust valve and to the exhaust passage of the other cylinders through a second exhaust valve.
Figure 14B:
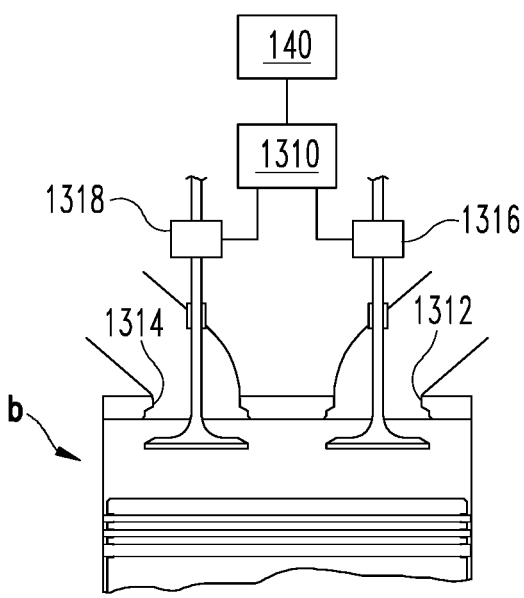

Referencing FIGS. 14A and 14B, a system 1300 that is a modification of system 100 is illustrated that includes EGR passage 109 connected directly to one exhaust port 1312 of each of primary EGR cylinders b with EGR exhaust port passages 1302, 1304. The other exhaust port 1314 of each primary EGR cylinder b is connected directly to exhaust passage 132 with exhaust port passages 1306, 1308. A variable exhaust valve actuator 1310 provides independent control of the exhaust port valves 1316, 1318 associated with respective ones of the exhaust ports 1312, 1314 of the primary EGR cylinders b to control the EGR flow 108 to intake passage 104 in response to detection of EGR fraction deviation conditions and during steady state operating conditions.

Figure 15A:
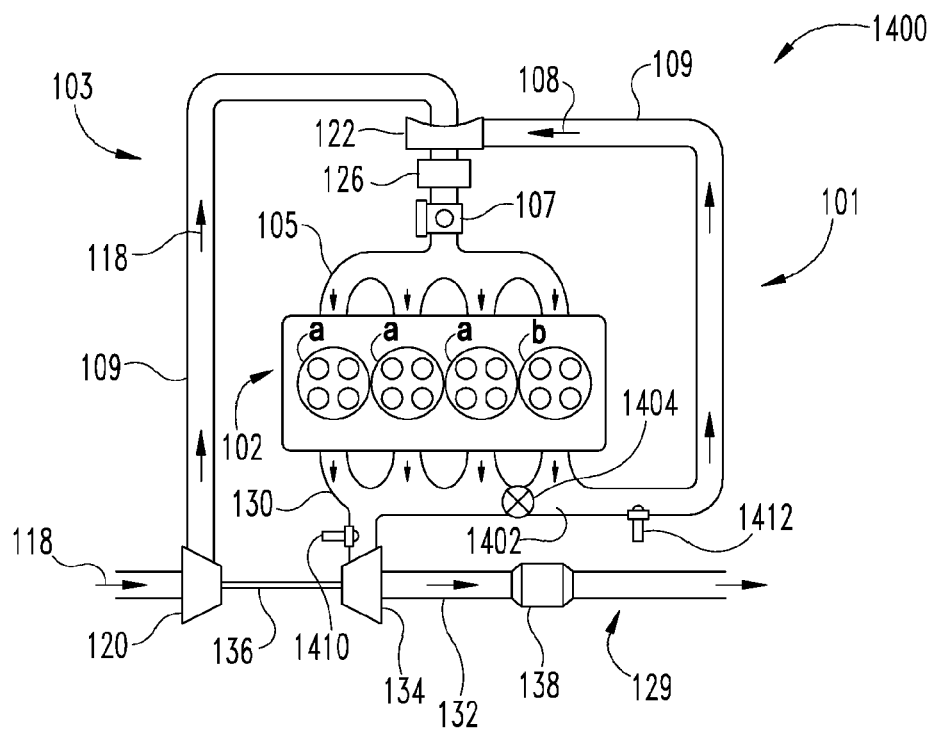
FIGS. 15A and 15B are schematic depictions of a system having primary EGR cylinders with an EGR passage connected to bleed exhaust flow from the primary EGR cylinders to the exhaust manifold of the other cylinders.
Figure 15B:
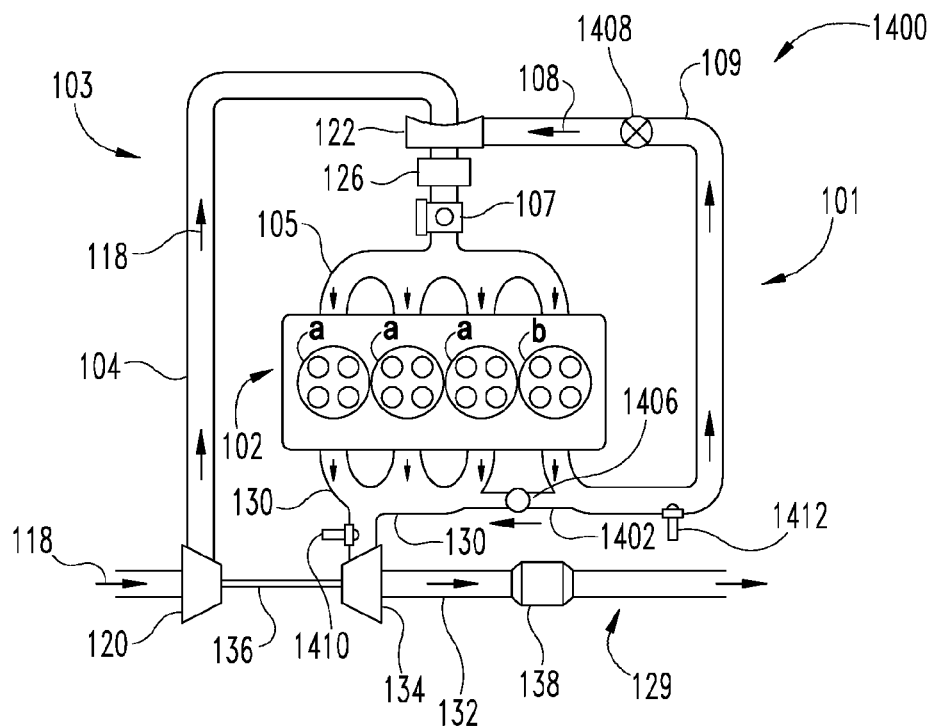

Referencing FIGS. 15A-15B, a system 1400 is shown that is a modification of system 100 to allow regulation of the EGR fraction by coordinating bleed-off from the EGR passage 109 and/or the exhaust manifold of one or more primary EGR cylinders b to the exhaust manifold 130 of the non-primary EGR cylinders a. A bleed-off passage 1402 is provided between the EGR passage 109 and exhaust manifold 130. In FIG. 15A, a dump valve 1404 is shown with and actuator (not shown) controlled by controller 140 to position control valve 1404 to bleed off EGR flow and provide an amount of recirculated exhaust gas needed in response to detection of an EGR fraction deviation condition. In FIG. 15B, a pop-off valve 1406 is shown to bleed off EGR flow as needed in response to detection of an EGR fraction deviation condition. Pop-off valve 1406 is controlled by modulating EGR valve 1408 in EGR passage 109 to control the pressure in EGR passage 109 and actuate pop-off valve 1406 in response to EGR fraction deviation conditions in which the desired amount of recirculated exhaust gas to achieve the expected EGR fraction requires a reduction in EGR flow.

Actuation of bleed-off valve 1404 and/or pop-off valve 1406 is coordinated by controller 140 with air-fuel ratio regulation via $O_2$ sensor 1410 associated with the exhaust flow from non-primary EGR cylinders a. As EGR flow is bled off from EGR passage 109, fuelling to non-primary cylinders a is leaned out in response to the quantity of EGR flow that is bled off to maintain overall stoichiometric conditions in exhaust manifold 130. $O_2$ sensor 1410 can be employed in conjunction with $O_2$ sensor 1412 in EGR passage 109 and the charge flow to regulate the EGR flow bleed off amount to maintain the overall air-fuel ratio at desired conditions.

Figure 16:
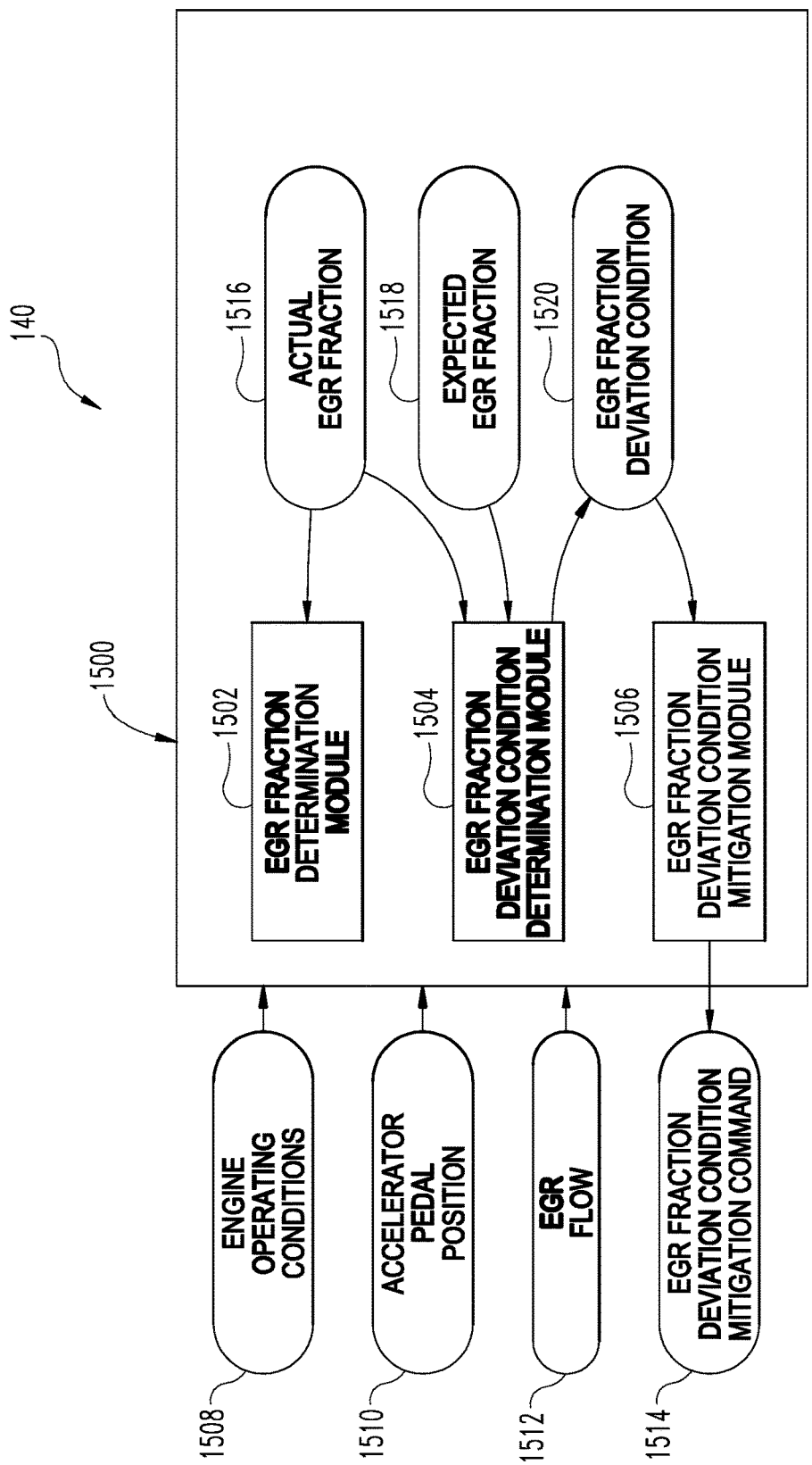
FIG. 16 is a schematic of one embodiment of a controller apparatus for mitigating EGR fraction deviation conditions.

Referring now to FIG. 16, one embodiment of controller 140 is shown including a controller apparatus 1500. Controller apparatus 1500 includes an EGR fraction determination module 1502, an EGR fraction deviation condition determination module 1504, and an EGR fraction deviation condition mitigation module 1506. In the illustrated embodiment, controller apparatus 1500 receives or interprets a number of inputs, such as engine operating conditions 1508, an accelerator pedal position 1510, and an EGR flow 1512.

EGR fraction determination module 1502 determines an actual EGR fraction 1516 from one or more of the engine operating conditions 1508, accelerator pedal position 1510 and EGR flow 1512. EGR fraction deviation condition determination module 1504 interprets the actual EGR fraction 1516 and a target or expected EGR fraction 1518 and determines or outputs an EGR fraction deviation condition determination 1520 in response to, for example, conditions in which the amount of recirculated exhaust gas providing the actual EGR fraction 1516 exceeds or is less than the expected EGR fraction 1518.

EGR fraction deviation condition mitigation module 1506 interprets the EGR fraction deviation condition 1518 and in response provides an EGR fraction deviation condition mitigation command 220. The EGR fraction deviation condition 1520 can include, for example, an EGR fraction overshoot condition in which the actual EGR fraction 1516 will exceed or is exceeding the expected EGR fraction 1518, or an EGR fraction undershoot condition in which the actual EGR fraction 1516 will exceed or is exceeding the expected EGR fraction 1518. The expected EGR fraction 1518 indicates that portion of the total exhaust flow that is provided as EGR flow 108 by the primary EGR cylinders b when all cylinders a, b are operating in the same manner. For example, in a six cylinder engine with two primary EGR cylinders b, the EGR fraction is 33%. In certain embodiments, the expected EGR fraction 1518 varies in response to a deactivation or fuelling cut-off to one or more of the primary EGR cylinders b, in response to activation or fuelling of a previously deactivated or non-fuelled primary EGR cylinder b, and/or in response to operating conditions.

Non-limiting examples of events resulting in an EGR fraction deviation condition 1520 that is an EGR fraction overshoot condition include, for example, an accelerator tip-out condition determined from accelerator pedal position 1510, transient conditions during engine operation determined from engine operating conditions 1508, and/or a steady state low load condition of operation of engine 102. An accelerator tip-out condition can result in an excess EGR flow due to excess exhaust gas accumulated in the EGR system 101 and the inability to change pressure in EGR passage 109 as quickly as the pressure in intake manifold 105 in response to the accelerator tip-out condition.

Non-limiting examples of events resulting in an EGR fraction deviation condition 1520 that is an EGR fraction undershoot condition include, for example, an accelerator tip-in condition determined from accelerator pedal position 1510, transient conditions during engine operation determined from engine operating conditions 1508, and/or a steady state low load condition of operation of engine 102. An accelerator tip-in condition can result in a starving of EGR flow due to the increased demand for charge flow and the inability to immediately produce sufficient EGR flow to satisfy the change in charge flow demand in response to the accelerator tip-in condition.

Engine operating conditions 1508 can include a change in engine speed, change in engine torque output, a torque request change, an intake manifold pressure and/or temperature, an exhaust manifold pressure and/or temperature, or any other condition suitable to indicate an EGR flow or expected change in the EGR flow. A steady state condition low load condition (less than 50% of maximum torque output of engine 102, for example) can result in an excess EGR flow due to internal residuals or internal EGR flow in primary EGR cylinders b that occur due to volumetric efficiency changes.

Controller apparatus 1500 is operable to interpret an EGR fraction deviation condition 1520 in response to determining a deviation of an actual EGR fraction 1516 from the expected EGR fraction 1518 in response to determining the EGR flow, determining an accelerator tip-out condition, determining an accelerator tip-in condition, determining a steady state low load condition, and combinations of these. The actual EGR fraction 1516 can be determined from engine operating conditions 1508 that include, for example, by direct measurement of EGR flow 108, a determination and a comparison of a mass air flow rate at the intake manifold 105 to a fresh air flow rate, a comparison of oxygen amounts in the EGR flow passage 109 and the exhaust manifold 130 of the non-primary EGR cylinders a, or other suitable measurement or determination technique.

Referencing further to FIGS. 1 and 3-15b, the systems disclosed therein can include controller apparatus 1500 to provide for regulation of the amount of recirculated exhaust gas and/or mitigation of the EGR fraction deviation condition 1520 by outputting an EGR fraction deviation mitigation command 1514 to an actuator or controller for a valve, variable valve actuation mechanism, and/or a fuel injector that controls the amount of recirculated exhaust gas in the charge flow. For example, EGR fraction deviation mitigation command can be output to one or more of an actuator of control valve 206, one-way valve 308, control valve 402 or 502, intake throttle 602, variable valve actuator mechanisms 702 or 1310, control valve 806, fuel injectors 1004, three-way valves 1102 or 1204, dump valve 1404, and EGR valve 1408.

Various aspects of the embodiments disclosed herein are contemplated. For example, according to one aspect a system includes an internal combustion engine having at least one primary EGR cylinder connected to provide an EGR flow to an EGR passage and a plurality of non-primary cylinders connected to provide an exhaust flow to an exhaust passage. The EGR passage is connected to an intake system to provide an EGR flow from the at least one primary EGR cylinder to the intake system, the EGR passage being one of flow isolated and flow isolatable from the exhaust passage. The intake system provides a charge flow to the at least one primary EGR cylinder and the plurality of non-primary cylinders. The charge flow includes an intake air flow and an EGR fraction provided by an amount of recirculated exhaust gas from at least the at least one primary EGR cylinder. The system includes a controller structured to interpret an EGR fraction deviation condition in which the EGR fraction provided by the amount of recirculated exhaust gas in the charge flow deviates from an expected EGR fraction, and in response to the EGR fraction deviation condition to adjust the amount of recirculated exhaust gas to the intake system toward the expected EGR fraction.

In one embodiment of the system, the intake system includes a compressor in an intake passage that is connected to a turbine in the exhaust passage operable to drive the compressor with the exhaust flow from the plurality of non-primary EGR cylinders. The EGR passage is connected to the intake passage downstream of the compressor.

In a refinement of this embodiment, the EGR passage is flow isolated from the exhaust passage and the system includes a low pressure EGR loop that connects the exhaust passage downstream of the turbine to the intake passage upstream of the compressor. The controller is configured to actuate a control valve in the low pressure EGR loop to adjust the amount of recirculated exhaust gas toward the expected EGR fraction by selectively providing a portion of the exhaust flow from the exhaust passage to the intake system through the low pressure EGR loop.

In another refinement of this embodiment, the EGR passage is flow isolated from the exhaust passage and the system includes a compressor EGR passage connecting the EGR passage to the intake system upstream of the compressor. In a further refinement, the controller is configured to actuate a control valve in the compressor EGR passage to selectively adjust the amount of recirculated exhaust gas toward the expected EGR fraction by selectively providing a portion of the EGR flow from the EGR passage to the intake system through the compressor EGR passage.

In a further refinement of this embodiment, the system includes a compressor EGR passage connecting the EGR passage to the intake system upstream of the compressor, a high pressure EGR passage connecting the EGR passage to the exhaust passage, and a three-way control valve operable to selectively connect the EGR passage with each of the compressor EGR passage and the high pressure EGR passage. The controller is configured to actuate the three-way control valve to adjust the amount of recirculated exhaust gas toward the expected EGR fraction by selectively providing at least one of a first portion of the EGR flow from the EGR passage to the intake passage through the compressor EGR passage, a second portion of the EGR flow from the EGR passage to the exhaust passage, and a portion of the exhaust flow from the exhaust passage to the intake system through the high pressure EGR passage and the EGR passage.

In another embodiment, the system includes a high pressure EGR passage connecting the EGR passage to the exhaust passage and a one-way valve in the high pressure EGR passage operable to selectively permit a portion of the exhaust flow from the exhaust passage to the EGR passage. The system also includes a control valve in the EGR passage downstream of the connection of the high pressure EGR passage to the EGR passage. The controller is configured to adjust the amount of recirculated exhaust gas toward the expected EGR fraction by actuating the one-way valve to selectively provide a portion of the exhaust flow from the exhaust passage to the intake system through the EGR passage and by actuating the control valve to selectively provide EGR flow and the portion of the exhaust flow in the EGR passage from the EGR passage to the intake system.

In a further embodiment, the system includes a high pressure EGR passage connecting the EGR passage to the exhaust passage and a control valve in the high pressure EGR passage. The controller is configured to adjust the amount of recirculated exhaust gas toward the expected EGR fraction by actuating the control valve to selectively provide one of a portion of the exhaust flow from the exhaust passage to the EGR passage and a portion of the EGR flow from the EGR passage to the exhaust passage. In a refinement of this embodiment, the intake system includes a compressor that is connected to a turbine in the exhaust passage and the turbine is operable to drive the compressor with the exhaust flow in the exhaust passage, and the high pressure EGR passage is connected to the exhaust passage upstream of the turbine.

In another embodiment, the intake system includes a compressor connected to a turbine in the exhaust passage and the turbine is operable to drive the compressor with the exhaust flow in the exhaust passage. The system includes a low pressure EGR passage connecting the EGR passage to the exhaust passage downstream of the turbine and a control valve in the low pressure EGR passage. The controller is configured to adjust the amount of recirculated exhaust gas toward the expected EGR fraction by actuating the control valve to provide a portion of the EGR flow from the EGR passage to the exhaust passage.

In yet another embodiment, the at least one primary EGR cylinder is connected to the intake system with a first intake manifold and a first intake throttle and the plurality of non-primary EGR cylinders are connected to the intake system with a second intake manifold and a second intake throttle. The controller is configured to adjust the amount of recirculated exhaust gas toward the expected EGR fraction by actuating the first intake throttle to regulate the charge flow to the at least one primary EGR cylinder to change the EGR flow from the at least one primary EGR cylinder.

In another embodiment, the at least one primary EGR cylinder is connected to a variable valve actuation mechanism and the controller is configured to adjust the amount of recirculated exhaust gas toward the expected EGR fraction by controlling the EGR flow from the at least one primary EGR cylinder with the variable valve actuating mechanism. In yet another embodiment, the system includes a fuel system connected by at least one injector to each of the at least one primary EGR cylinder and the plurality of non-primary EGR cylinders. The controller is configured to adjust the amount of recirculated exhaust gas toward the expected EGR fraction by cutting fuelling to the at least one primary EGR cylinder to reduce the EGR flow from the at least one primary EGR cylinder.

In another embodiment, the at least one primary EGR cylinder includes at least two primary EGR cylinders, and a first exhaust port of each primary EGR cylinder is connected to the EGR passage and a second exhaust port of each primary EGR cylinder is connected to the exhaust passage. In a refinement of this embodiment, the exhaust passage and the EGR passage are flow isolated from one another. In a further refinement, the system includes a variable valve actuation mechanism connected to exhaust valves associated with each of the first and second exhaust ports. The variable valve actuation mechanism is operable to independently control the exhaust valves associated with the first exhaust port relative to the exhaust valves associated with the second exhaust ports to adjust the amount of recirculated exhaust gas toward the expected EGR fraction.

In another embodiment, the EGR passage is connected to an exhaust manifold of the non-primary EGR cylinders with a bleed-off passage. The bleed-off passage includes a valve to control EGR flow from the EGR passage through the bleed-off passage to adjust the amount of recirculated exhaust gas toward the expected EGR fraction. In a refinement of this embodiment, the system includes a control valve in the EGR passage and the controller is configured to actuate the control valve to open the valve in the bleed-off passage to adjust the amount of recirculated exhaust gas toward the expected EGR fraction. In another refinement of this embodiment, the controller is configured to interpret a first oxygen amount in the exhaust manifold and a second oxygen amount in the EGR passage. The controller is further configured to determine an amount of EGR flow to bleed-off through the bleed-off passage to adjust the amount of recirculated exhaust gas toward the expected EGR fraction in response to the first and second oxygen amounts.

In another embodiment, the controller is configured to interpret the EGR fraction deviation condition in response to an accelerator tip-in condition, an accelerator tip-out condition, and a transient operating condition of the engine.

According to another aspect, a method includes providing a charge flow to an internal combustion engine having at least one primary EGR cylinder connected to an EGR passage and a plurality of non-primary EGR cylinders connected to an exhaust passage; passing an exhaust flow from the non-primary EGR cylinders through the exhaust passage; passing an EGR flow from the at least one primary EGR cylinder through the EGR passage to an intake system, the charge flow including an EGR fraction corresponding to an amount of recirculated exhaust gas in the charge flow from at least the at least one primary EGR cylinder; determining an EGR fraction deviation condition in the charge flow to the internal combustion in engine in response to a deviation of the EGR fraction from an expected EGR fraction; and in response to determining the EGR fraction deviation condition, adjusting the amount of recirculated exhaust gas provided to the intake system to mitigate or reduce the deviation of the EGR fraction from the expected EGR fraction.

In one embodiment, the method includes compressing the intake flow with a compressor in an intake passage of the intake system where the compressor is connected to a turbine in the exhaust passage that drives the compressor with the exhaust flow from the plurality of non-primary EGR cylinders.

In one refinement of this embodiment, the EGR passage is flow isolated from the exhaust passage and connected to the intake system downstream of the compressor. In a further refinement, adjusting the recirculated amount of exhaust gas includes selectively providing a portion of the exhaust flow from the exhaust passage into the intake passage through a low pressure EGR loop connecting the exhaust passage to the intake passage downstream of the turbine and upstream of the compressor. In another further refinement, adjusting the recirculated amount of exhaust gas includes selectively providing a portion of the EGR flow to the intake system through a compressor EGR passage that is connected to the intake system upstream of the compressor.

In another refinement of the previous embodiment, the EGR passage is connected to the intake system downstream of the compressor. Adjusting the recirculated amount of exhaust gas includes selectively providing a first portion of the EGR flow to the intake system through a compressor EGR passage connecting the EGR passage to the intake system upstream of the compressor and selectively providing a second portion of the EGR flow to the exhaust system through a high pressure EGR passage connecting the EGR passage to the exhaust passage upstream of the turbine. The EGR passage is selectively connected to the compressor EGR passage and the high pressure EGR passage with a three-way control valve.

In yet another refinement of the previous embodiment, adjusting the recirculated amount of exhaust gas includes selectively providing a portion of the EGR flow from the EGR passage to the exhaust passage through a low pressure EGR passage connecting the EGR passage to the exhaust passage downstream of the turbine.

In another embodiment, adjusting the recirculated amount of exhaust gas includes selectively providing a portion of the exhaust flow from the exhaust passage to the intake system through the EGR passage in response to the EGR fraction being less than the expected EGR fraction. In another embodiment, adjusting the recirculated amount of exhaust gas includes selectively providing a portion of the EGR flow from the EGR passage to the exhaust passage in response to the EGR fraction exceeding the expected EGR fraction.

In yet another embodiment, adjusting the recirculated amount of exhaust gas includes selectively controlling the charge flow to the at least one primary EGR cylinder independently of the charge flow to the plurality of non-primary EGR cylinders. In still another embodiment, adjusting the recirculated amount of exhaust gas includes cutting fuelling to the at least one primary EGR cylinder to reduce the EGR flow in response to the EGR fraction exceeding the expected EGR fraction.

In another embodiment, adjusting the recirculated amount of exhaust gas includes selectively controlling the EGR flow from the at least one primary EGR cylinder to the EGR passage through a first exhaust port while providing a portion of the exhaust flow to the exhaust passage through a second exhaust port of the primary EGR cylinder that is connected to the exhaust passage. In yet another embodiment, determining the EGR fraction deviation condition includes detecting one of an accelerator tip-in condition and an accelerator tip-out condition.

In still another embodiment, adjusting the recirculated amount of exhaust gas includes selectively bleeding a portion of the EGR flow from the EGR passage to an exhaust manifold connected to the non-primary EGR cylinders. In a further embodiment, the method includes restricting the EGR flow in the EGR passage to bleed the portion of the EGR flow to the exhaust manifold.

According to another aspect, an apparatus includes an internal combustion engine including a plurality of cylinders that receive a charge flow from an intake system. At least one of the plurality of cylinders is a primary EGR cylinder connected to the intake system to provide an EGR flow that mixes with an intake air flow to the plurality of cylinders. Remaining ones of the plurality of cylinders are connected to an exhaust system to provide an exhaust flow to an aftertreatment device of the exhaust system. The apparatus includes a controller having an EGR fraction determination module structured to determine an actual EGR fraction in the charge flow and an EGR fraction deviation condition module structured to determine an EGR fraction deviation condition in response to the actual EGR fraction and an expected EGR fraction. The controller also includes an EGR fraction deviation condition mitigation module structured to output an EGR fraction deviation mitigation command in response to the EGR fraction deviation condition to at least one of a valve, variable valve actuation mechanism, an intake throttle, and a fuel injector, so that an amount of recirculated exhaust gas in the charge flow is adjusted in response to the EGR fraction deviation command.

In one embodiment of the apparatus, the EGR fraction deviation mitigation command is output to the intake throttle. The intake throttle is upstream of the at least one primary EGR cylinder, and the remaining ones of the plurality of cylinders are fluidly isolated from the intake throttle. In another embodiment, the valve is a three-way valve connecting the EGR passage to the intake system and to the exhaust system. The EGR fraction deviation condition mitigation command is output to the three-way valve to selectively position the three-way valve to provide the amount of recirculated exhaust gas.

In another embodiment of the apparatus, the at least one primary EGR cylinder includes first and second primary EGR cylinders. The first primary EGR cylinder is connected to the intake system with an EGR passage, and the second primary EGR cylinder is connected to the EGR passage and to the exhaust system with a three-way valve and a flexible EGR passage. The EGR fraction deviation condition mitigation command is output to the three-way valve to selectively position the three-way valve to provide the amount of recirculated exhaust gas.

In yet another embodiment of the apparatus, the EGR fraction deviation condition module is structured to determine the actual EGR fraction in response to at least one of an amount of recirculated exhaust gas in the charge flow, an accelerator tip-in condition, and an accelerator tip-out condition. In still another embodiment, the at least one primary EGR cylinder includes a first primary EGR cylinder and a second primary EGR cylinder, and a first exhaust port of each of the first and second primary EGR cylinders is directly connected to the EGR passage and a second exhaust port of each of the first and second primary EGR cylinders is directly connected to the exhaust system. In a refinement of this embodiment, the variable valve actuation mechanism is configured to control exhaust valves of the first exhaust ports independently of exhaust valves of the second exhaust ports to adjust the amount of recirculated exhaust gas from the first exhaust ports.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed:

1. A method of controlling a charge flow to an internal combustion engine having at least one primary exhaust gas recirculation (EGR) cylinder connected to an EGR passage and a plurality of non-primary EGR cylinders connected to an exhaust passage, comprising:
supplying an exhaust flow from the non-primary EGR cylinders through the exhaust passage;
supplying an EGR flow from the at least one primary EGR cylinder through the EGR passage to an intake system, the charge flow including an EGR fraction corresponding to an amount of recirculated exhaust gas in the charge flow from at least the at least one primary EGR cylinder; and
during a transient operating condition of the internal combustion engine,
determining, with a controller, an EGR fraction deviation condition in the charge flow to the internal combustion engine in response to a deviation of the EGR fraction from an expected EGR fraction via adjusting at least one fuel injector of a fuel system to de-fuel a fuel flow the at least one primary EGR cylinder; and
adjusting, with the controller, the amount of recirculated exhaust gas provided to the intake system via adjusting an exhaust valve of the at least one primary EGR cylinder to mitigate or reduce the deviation of the EGR fraction from the expected EGR fraction in response to determining the EGR fraction deviation condition.

2. The method of claim 1, further comprising compressing the intake flow with a compressor in an intake passage of the intake system;
wherein the compressor is connected to a turbine in the exhaust passage that drives the compressor with the exhaust flow from the plurality of non-primary EGR cylinders.

3. The method of claim 2, wherein:
the EGR passage is flow isolated from the exhaust passage and connected to the intake system downstream of the compressor; and
adjusting the recirculated amount of exhaust gas includes selectively providing a portion of the exhaust flow from the exhaust passage into the intake passage through a low pressure EGR loop connecting the exhaust passage to the intake passage downstream of the turbine and upstream of the compressor.

4. The method of claim 2, wherein:
the EGR passage is flow isolated from the exhaust passage and connected to the intake system downstream of the compressor; and
adjusting the recirculated amount of exhaust gas includes selectively providing a portion of the EGR flow to the intake system through a compressor EGR passage that is connected to the intake system upstream of the compressor.

5. The method of claim 2, wherein:
the EGR passage is connected to the intake system downstream of the compressor; and
adjusting the recirculated amount of exhaust gas includes selectively providing a first portion of the EGR flow to the intake system through a compressor EGR passage connecting the EGR passage to the intake system upstream of the compressor and selectively providing a second portion of the EGR flow to the exhaust system through a high pressure EGR passage connecting the EGR passage to the exhaust passage upstream of the turbine;
wherein the EGR passage is selectively connected to the compressor EGR passage and the high pressure EGR passage with a three-way control valve.

6. The method of claim 2, wherein adjusting the recirculated amount of exhaust gas includes selectively providing a portion of the EGR flow from the EGR passage to the exhaust passage through a low pressure EGR passage connecting the EGR passage to the exhaust passage downstream of the turbine.

7. The method of claim 1, wherein adjusting the recirculated amount of exhaust gas includes selectively providing a portion of the exhaust flow from the exhaust passage to the intake system through the EGR passage in response to the EGR fraction being less than the expected EGR fraction.

8. The method of claim 1, wherein adjusting the recirculated amount of exhaust gas includes selectively providing a portion of the EGR flow from the EGR passage to the exhaust passage in response to the EGR fraction exceeding the expected EGR fraction.

9. The method of claim 1, wherein adjusting the recirculated amount of exhaust gas includes selectively controlling the charge flow to the at least one primary EGR cylinder independently of the charge flow to the plurality of non-primary EGR cylinders.

10. The method of claim 1, wherein adjusting the recirculated amount of exhaust gas includes selectively controlling the EGR flow from the at least one primary EGR cylinder to the EGR passage through a first exhaust port while providing a portion of the exhaust flow to the exhaust passage through a second exhaust port of the primary EGR cylinder that is connected to the exhaust passage.

11. The method of claim 1, wherein determining the EGR fraction deviation condition includes detecting one of an accelerator tip-in condition and an accelerator tip-out condition.

12. The method of claim 1, wherein adjusting the recirculated amount of exhaust gas includes selectively bleeding a portion of the EGR flow from the EGR passage to an exhaust manifold connected to the non-primary EGR cylinders.

13. The method of claim 12, further comprising restricting the EGR flow in the EGR passage to bleed the portion of the EGR flow to the exhaust manifold.

14. An apparatus, comprising: an internal combustion engine including a plurality of cylinders that receive a charge flow from an intake system, at least one of the plurality of cylinders being a primary exhaust gas recirculation (EGR) cylinder connected to the intake system to provide an EGR flow that mixes with an intake air flow to the plurality of cylinders, and remaining ones of the plurality of cylinders being connected to an exhaust system to provide an exhaust flow to an aftertreatment device of the exhaust system; and
a controller comprising:
an EGR fraction determination module determining an actual EGR fraction in the charge flow;
an EGR fraction deviation condition module determining an EGR fraction deviation condition in response to the actual EGR fraction and an expected EGR fraction; and
an EGR fraction deviation condition mitigation module outputting an EGR fraction deviation mitigation command in response to the EGR fraction deviation condition via adjusting at least one of a valve, a variable valve actuation mechanism, an intake throttle, and a fuel injector;
wherein an amount of recirculated exhaust gas in the charge flow is adjusted in response to the EGR fraction deviation command.

15. The apparatus of claim 14, wherein the EGR fraction deviation mitigation command is output to the intake throttle, the intake throttle being upstream of the at least one primary EGR cylinder, the remaining ones of the plurality of cylinders being fluidly isolated from the intake throttle.

16. The apparatus of claim 14, wherein the valve is a three-way valve connecting the EGR passage to the intake system and to the exhaust system, the EGR fraction deviation condition mitigation command being output to the three-way valve to selectively position the three-way valve to provide the amount of recirculated exhaust gas.

17. The apparatus of claim 14, wherein the at least one primary EGR cylinder includes first and second primary EGR cylinders, the first primary EGR cylinder being connected to the intake system with an EGR passage, the second primary EGR cylinder being connected to the EGR passage and to the exhaust system with a three-way valve and a flexible EGR passage, the EGR fraction deviation condition mitigation command being output to the three-way valve to selectively position the three-way valve to provide the amount of recirculated exhaust gas.

18. The apparatus of claim 14, wherein the EGR fraction deviation condition module determining the actual EGR fraction is in response to at least one of an amount of recirculated exhaust gas in the charge flow, an accelerator tip-in condition, and an accelerator tip-out condition.

19. The apparatus of claim 14, wherein the at least one primary EGR cylinder includes a first primary EGR cylinder and a second primary EGR cylinder, and a first exhaust port of each of the first and second primary EGR cylinders is directly connected to the EGR passage and a second exhaust port of each of the first and second primary EGR cylinders is directly connected to the exhaust system.

20. The apparatus of claim 19, wherein the variable valve actuation mechanism is configured to control exhaust valves of the first exhaust ports independently of exhaust valves of the second exhaust ports to adjust the amount of recirculated exhaust gas from the first exhaust ports.

21. A system comprising:
an internal combustion engine having at least one primary exhaust gas recirculation (EGR) cylinder connected to provide an EGR flow to an EGR passage and a plurality of non-primary cylinders connected to provide an exhaust flow to an exhaust passage;
wherein the EGR passage is connected to an intake system to provide an EGR flow from the at least one primary EGR cylinder to the intake system, the EGR passage being one of flow isolated and flow isolatable from the exhaust passage;
wherein the intake system provides a charge flow to the at least one primary EGR cylinder and the plurality of non-primary cylinders, the charge flow including an intake air flow and an EGR fraction provided by an amount of recirculated exhaust gas from at least the at least one primary EGR cylinder; and
a controller operably connected to the internal combustion engine, the controller including a non-transitory computer readable medium with executable instructions
to determine an EGR fraction deviation condition in which the EGR fraction provided by the amount of recirculated exhaust gas in the charge flow deviates from an expected EGR fraction; and
to adjust the amount of recirculated exhaust gas to the intake system toward the expected EGR fraction in response to the EGR fraction deviation condition via adjusting at least one fuel injector of a fuel system to de-fuel a fuel flow to the at least one primary EGR cylinder to reduce the EGR flow from the at least one primary EGR cylinder.

22. The system of claim 21, wherein:
the intake system includes a compressor in an intake passage that is connected to a turbine in the exhaust passage operable to drive the compressor with the exhaust flow from the plurality of non-primary EGR cylinders; and
the EGR passage is connected to the intake passage downstream of the compressor.

23. The system of claim 22, wherein the EGR passage is flow isolated from the exhaust passage and further comprising a low pressure EGR loop that connects the exhaust passage downstream of the turbine to the intake passage upstream of the compressor;
wherein the controller further comprises executable instructions to actuate a control valve in the low pressure EGR loop to adjust the amount of recirculated exhaust gas toward the expected EGR fraction by selectively providing a portion of the exhaust flow from the exhaust passage to the intake system through the low pressure EGR loop.

24. The system of claim 22, wherein the EGR passage is flow isolated from the exhaust passage and further comprising a compressor EGR passage connecting the EGR passage to the intake system upstream of the compressor.

25. The system of claim 24, wherein the controller further comprises executable instructions to actuate a control valve in the compressor EGR passage to selectively adjust the amount of recirculated exhaust gas toward the expected EGR fraction by selectively providing a portion of the EGR flow from the EGR passage to the intake system through the compressor EGR passage.

26. The system of claim 22, further comprising:
a compressor EGR passage connecting the EGR passage to the intake system upstream of the compressor;
a high pressure EGR passage connecting the EGR passage to the exhaust passage; and
a three-way control valve operable to selectively connect the EGR passage with each of the compressor EGR passage and the high pressure EGR passage;
wherein the controller further comprises executable instructions to actuate the three-way control valve to adjust the amount of recirculated exhaust gas toward the expected EGR fraction by selectively providing at least one of a first portion of the EGR flow from the EGR passage to the intake passage through the compressor EGR passage, a second portion of the EGR flow from the EGR passage to the exhaust passage, and a portion of the exhaust flow from the exhaust passage to the intake system through the high pressure EGR passage and the EGR passage.

27. The system of claim 21, further comprising:
a high pressure EGR passage connecting the EGR passage to the exhaust passage and a one-way valve in the high pressure EGR passage operable to selectively permit a portion of the exhaust flow from the exhaust passage to the EGR passage; and
a control valve in the EGR passage downstream of the connection of the high pressure EGR passage to the EGR passage;
wherein the controller further comprises executable instructions figured to adjust the amount of recirculated exhaust gas toward the expected EGR fraction by actuating the one-way valve to selectively provide a portion of the exhaust flow from the exhaust passage to the intake system through the EGR passage and by actuating the control valve to selectively provide EGR flow and the portion of the exhaust flow in the EGR passage from the EGR passage to the intake system.

28. The system of claim 21, further comprising a high pressure EGR passage connecting the EGR passage to the exhaust passage and a control valve in the high pressure EGR passage;
wherein the controller further comprises executable Instructions to adjust the amount of recirculated exhaust gas toward the expected EGR fraction by actuating the control valve to selectively provide one of a portion of the exhaust flow from the exhaust passage to the EGR passage and a portion of the EGR flow from the EGR passage to the exhaust passage.

29. The system of claim 28, wherein the intake system includes a compressor that is connected to a turbine in the exhaust passage and the turbine is operable to drive the compressor with the exhaust flow in the exhaust passage, and the high pressure EGR passage is connected to the exhaust passage upstream of the turbine.

30. The system of claim 21,
wherein the intake system includes a compressor connected to a turbine in the exhaust passage and the turbine is operable to drive the compressor with the exhaust flow in the exhaust passage, and further comprising:
a low pressure EGR passage connecting the EGR passage to the exhaust passage downstream of the turbine; and
a control valve in the low pressure EGR passage; and
wherein the controller further comprises executable instructions to adjust the amount of recirculated exhaust gas toward the expected EGR fraction by actuating the control valve to provide a portion of the EGR flow from the EGR passage to the exhaust passage.

31. The system of claim 21,
wherein the at least one primary EGR cylinder is connected to the intake system with a first intake manifold and a first intake throttle, the plurality of non-primary EGR cylinders are connected to the intake system with a second intake manifold and a second intake throttle; and
wherein the controller further comprises executable instructions to adjust the amount of recirculated exhaust gas toward the expected EGR fraction by actuating the first intake throttle to regulate the charge flow to the at least one primary EGR cylinder to change the EGR flow from the at least one primary EGR cylinder.

32. The system of claim 21,
wherein the at least one primary EGR cylinder is connected to a variable valve actuation mechanism; and
wherein the controller further comprises executable instructions to adjust the amount of recirculated exhaust gas toward the expected EGR fraction by controlling the EGR flow from the at least one primary EGR cylinder with the variable valve actuating mechanism.

33. The system of claim 21,
wherein the at least one primary EGR cylinder includes at least two primary EGR cylinders; and
wherein a first exhaust port of each primary EGR cylinder is connected to the EGR passage and a second exhaust port of each primary EGR cylinder is connected to the exhaust passage.

34. The system of claim 33, wherein the exhaust passage and the EGR passage are flow isolated from one another.

35. The system of claim 33, further comprising a variable valve actuation mechanism connected to exhaust valves associated with each of the first and second exhaust ports;
wherein the variable valve actuation mechanism is operable to independently control the exhaust valves associated with the first exhaust port relative to the exhaust valves associated with the second exhaust ports to adjust the amount of recirculated exhaust gas toward the expected EGR fraction.

36. The system of claim 21, wherein the EGR passage is connected to an exhaust manifold of the non-primary EGR cylinders with a bleed-off passage, the bleed-off passage including a valve to control EGR flow from the EGR passage through the bleed-off passage to adjust the amount of recirculated exhaust gas toward the expected EGR fraction.

37. The system of claim 36, further comprising a control valve in the EGR passage;
wherein the controller further comprises executable instructions to actuate the control valve to open the valve in the bleed-off passage to adjust the amount of recirculated exhaust gas toward the expected EGR fraction.

38. The system of claim 36,
wherein the controller further comprises executable Instructions to interpret a first oxygen amount in the exhaust manifold and a second oxygen amount in the EGR passage; and
wherein the controller further comprises executable Instructions to determine an amount of EGR flow to bleed-off through the bleed-off passage to adjust the amount of recirculated exhaust gas toward the expected EGR fraction in response to the first and second oxygen amounts.

39. The system of claim 21, wherein the controller further comprises executable instructions to determine the EGR fraction deviation condition in response to an accelerator tip-in condition, an accelerator tip-out condition, and a transient operating condition of the engine.

\* \* \* \* \*